US011175947B2

(12) United States Patent
Oezmen et al.

(10) Patent No.: US 11,175,947 B2
(45) Date of Patent: Nov. 16, 2021

(54) MICROSERVICES CHANGE MANAGEMENT AND ANALYTICS

(71) Applicant: INTERNATIONAL BUSINESS MACHINES CORPORATION, Armonk, NY (US)

(72) Inventors: Selcuk Nedim Oezmen, Castrop-Rauxel (DE); Clea Anne Zolotow, Key West, FL (US); Ulrike Vauth, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 16/701,398

(22) Filed: Dec. 3, 2019

(65) Prior Publication Data
US 2021/0165679 A1 Jun. 3, 2021

(51) Int. Cl.
*G06F 21/57* (2013.01)
*G06F 8/76* (2018.01)
(Continued)

(52) U.S. Cl.
CPC ........ *G06F 9/4843* (2013.01); *G06F 11/0793* (2013.01); *G06F 11/1405* (2013.01);
(Continued)

(58) Field of Classification Search
CPC .......... G06F 9/4843; G06F 9/546; G06F 9/46; G06F 11/0793; G06F 11/1405;
(Continued)

(56) References Cited

U.S. PATENT DOCUMENTS 10,656,929 B2 * 5/2020 Jamjoom ............ G06F 11/3612
10,924,367 B2 * 2/2021 Sinha .................... H04L 67/327
(Continued)

FOREIGN PATENT DOCUMENTS

| CN | 106603583 A | 4/2017 |
|---|---|---|
| CN | 110417598 A | 11/2019 |
| EP | 3499800 A1 | 6/2019 |

OTHER PUBLICATIONS

Henning Schulz et al., Microservice-tailored Generation of Session-based Workload Models for Representative Load Testing, 2019 IEEE, [Retrieved on Sep. 15, 2021], Retrieved from the internet: <URL: https://ieeexplore.ieee.org/stamp/stamp.jsp?tp=&arnumber=8843284> 13 Pages (323-335) (Year: 2019).*

(Continued)

*Primary Examiner* — Anibal Rivera
(74) *Attorney, Agent, or Firm* — Cuenot, Forsythe & Kim, LLC

(57) ABSTRACT

Managing microservice changes and performing related analytics can include generating a plurality of process instance representations. Each process instance representation can be generated based on a corresponding process path that comprises an ordered sequence of operations that are performed by a process using multiple microservices. A microservices network representation can be constructed based on the plurality of process instance representations, each element of the microservices network corresponding to an interface between a pair of the microservices. Based on the microservices network representation, a relative frequency can be determined for each of the microservices, each relative frequency corresponding to a likelihood that a change in a microservice will affect the performance of at least one process using at least one of the microservices.

20 Claims, 12 Drawing Sheets

(51) Int. Cl.
*G06F 9/448* (2018.01)
*G06F 9/48* (2006.01)
*G06F 11/14* (2006.01)
*G06F 11/07* (2006.01)
*G06F 9/54* (2006.01)
*G06F 9/46* (2006.01)
*G06F 11/36* (2006.01)

(52) U.S. Cl.
CPC ............... *G06F 9/46* (2013.01); *G06F 9/546* (2013.01); *G06F 11/0772* (2013.01); *G06F 11/3664* (2013.01)

(58) Field of Classification Search
CPC ............ G06F 11/0772; G06F 11/3664; G06F 21/562; G06F 21/55; G06F 8/71; G06F 8/62; G06F 8/46; G06F 8/658
See application file for complete search history.

(56) References Cited

U.S. PATENT DOCUMENTS

| | | | |
|---|---|---|---|
| 2017/0046146 A1* | 2/2017 | Jamjoom | ................. G06F 8/71 |
| 2018/0034839 A1 | 2/2018 | Ahuja et al. | |
| 2018/0088925 A1 | 3/2018 | Emeis et al. | |
| 2018/0103064 A1 | 4/2018 | Ahuja et al. | |
| 2018/0191680 A1 | 7/2018 | Ahuja et al. | |
| 2018/0270122 A1 | 9/2018 | Brown et al. | |
| 2018/0329729 A1 | 11/2018 | Sun et al. | |
| 2018/0365008 A1 | 12/2018 | Chandramouli et al. | |
| 2019/0138728 A1 | 5/2019 | Ahuja et al. | |
| 2019/0179631 A1 | 6/2019 | Benedetti et al. | |
| 2020/0366580 A1* | 11/2020 | Sinha | ................... H04L 43/045 |

OTHER PUBLICATIONS

Thomas Thiele et al., Exploring Research Networks with Data Science, 2016 IEEE, [Retrieved on Sep. 15, 2021], Retrieved from the internet: <URL: https://ieeexplore.ieee.org/stamp/stamp.jsp?tp=&arnumber=7592732> 6 Pages (246-251) (Year: 2016).*

WIPO Appln. PCT/IB2020/060953, International Search Report and Written Opinion, dated Feb. 25, 2021, 7 pg.

Bugwadia, J., "Change Management for Containerized Applications," [online] Nirmata © 2018, In Product, Jan. 4, 2017, retrieved from the Internet: <https://www.nirmata.com/2017/01/04/change-management-for-containerized-applications/>, 5 pg.

* cited by examiner

| TALKS TO | MS1 | MS2 | MS3 | MS4 | MS5 | MS6 | P1 | P2 | P3 | SUM |
|---|---|---|---|---|---|---|---|---|---|---|
| MS1 | 0 |   | 0 | 0 | 0 | 0 | 0 | 0 | 0 | 1 |
| MS2 | 1 | 0 | 0 | 1 | 1 | 1 | 0 | 0 | 0 | 4 |
| MS3 | 0 | 0 |   | 0 | 0 | 0 | 0 | 0 | 0 | 0 |
| MS4 | 0 | 1 | 0 |   | 0 | 0 | 0 | 0 | 0 | 1 |
| MS5 | 0 | 1 | 0 | 0 |   | 0 | 0 | 0 | 0 | 1 |
| MS6 | 0 | 0 | 0 | 0 | 0 |   | 0 | 1 | 0 | 1 |
| P1 | 0 | 0 | 0 | 0 | 0 | 0 |   | 0 | 0 | 0 |
| P2 | 0 | 1 | 0 | 0 | 0 | 0 | 0 |   | 0 | 1 |
| P3 | 0 | 0 | 0 | 0 | 0 | 0 | 0 | 0 |   | 0 |
| SUM | 1 | 4 | 0 | 1 | 1 | 1 | 0 | 1 | 0 | 9 |

| TALKS TO | MS1 | MS2 | MS3 | MS4 | MS5 | MS6 | P1 | P2 | P3 | SUM |
|---|---|---|---|---|---|---|---|---|---|---|
| MS1 | 0 | 1 | 1 | 0 | 2 | 0 | 0 | 0 | 0 | 4 |
| MS2 | 2 | 1 | 0 | 1 | 1 | 1 | 0 | 0 | 0 | 6 |
| MS3 | 1 | 0 | 0 | 0 | 0 | 0 | 0 | 0 | 1 | 2 |
| MS4 | 0 | 2 | 0 | 0 | 0 | 0 | 0 | 0 | 0 | 2 |
| MS5 | 0 | 1 | 0 | 0 | 0 | 0 | 0 | 0 | 0 | 3 |
| MS6 | 0 | 0 | 1 | 0 | 0 | 2 | 1 | 1 | 0 | 4 |
| P1 | 1 | 0 | 0 | 0 | 0 | 1 | 0 | 0 | 0 | 1 |
| P2 | 0 | 1 | 0 | 1 | 0 | 0 | 0 | 0 | 0 | 1 |
| P3 | 0 | 0 | 0 | 0 | 0 | 0 | 0 | 0 | 0 | 1 |
| SUM | 4 | 6 | 2 | 2 | 3 | 4 | 1 | 1 | 1 | 24 |

FIG. 2D

| TALKS TO | MS1 | MS2 | MS3 | MS4 | MS5 | MS6 | P1 | P2 | P3 | SUM |
|---|---|---|---|---|---|---|---|---|---|---|
| MS1 | 0.00 | 0.25 | 0.25 | 0.00 | 0.50 | 0.00 | 0.00 | 0.00 | 0.00 | 1 |
| MS2 | 0.33 | 0.17 | 0.00 | 0.17 | 0.17 | 0.17 | 0.00 | 0.00 | 0.00 | 1 |
| MS3 | 0.50 | 0.00 | 0.00 | 0.00 | 0.00 | 0.00 | 0.00 | 0.00 | 0.50 | 1 |
| MS4 | 0.00 | 1.00 | 0.00 | 0.00 | 0.00 | 0.00 | 0.00 | 0.00 | 0.00 | 1 |
| MS5 | 0.00 | 0.33 | 0.25 | 0.00 | 0.00 | 0.67 | 0.00 | 0.00 | 0.00 | 1 |
| MS6 | 0.00 | 0.00 | 0.00 | 0.00 | 0.00 | 0.25 | 0.25 | 0.25 | 0.00 | 1 |
| P1 | 1.00 | 0.00 | 0.00 | 0.00 | 0.00 | 0.00 | 0.00 | 0.00 | 0.00 | 1 |
| P2 | 0.00 | 1.00 | 0.00 | 0.00 | 0.00 | 0.00 | 0.00 | 0.00 | 0.00 | 1 |
| P3 | 0.00 | 0.00 | 0.00 | 1.00 | 0.00 | 0.00 | 0.00 | 0.00 | 0.00 | 1 |
| SUM | 1.83 | 2.75 | 0.50 | 1.17 | 0.67 | 1.08 | 0.25 | 0.25 | 0.50 | 9 |

MICROSERVICES CHANGE MANAGEMENT AND ANALYTICS

BACKGROUND

This disclosure relates to software development and operations, and more particularly, to monitoring and maintaining resiliency of microservices and other networked components that provide functions within process instances.

Microservices are software constructs that can be used to build software applications by breaking down each application into smaller, independently deployable services that are not dependent, for example, upon a specific coding language. Using microservices, a large complex application can be divvied up into smaller building blocks of executables that when recomposed provide the functionality of a large scale, highly complex application.

SUMMARY

In one or more embodiments, a method includes generating a plurality of process instance representations, wherein each process instance representation is generated based on a corresponding process path comprising an ordered sequence of operations performed by a process using at least one of a plurality of microservices. The method also includes constructing a microservices network representation based on the plurality of process instance representations, wherein each element of the microservices network corresponds to an interface between a pair of microservices. Additionally, the method includes determining based on the microservices network representation a relative frequency for each of the plurality of microservices, each relative frequency corresponding to a likelihood that a change in a microservice will affect the functioning of at least one process using at least one of the plurality of microservices.

In one or more embodiments, a system includes a processor configured to initiate operations. The operations include generating a plurality of process instance representations, wherein each process instance representation is generated based on a corresponding process path comprising an ordered sequence of operations performed by a process using at least one of a plurality of microservices. The operations also include constructing a microservices network representation based on the plurality of process instance representations, wherein each element of the microservices network corresponds to an interface between a pair of microservices. Additionally, the operations include determining based on the microservices network representation a relative frequency for each of the plurality of microservices, each relative frequency corresponding to a likelihood that a change in a microservice will affect the functioning of at least one process using at least one of the plurality of microservices.

In one or more embodiments, a computer program product includes a computer readable storage medium having instructions stored thereon. The instructions are executable by a processor to initiate operations. The operations include generating a plurality of process instance representations, wherein each process instance representation is generated based on a corresponding process path comprising an ordered sequence of operations performed by a process using at least one of a plurality of microservices. The operations also include constructing a microservices network representation based on the plurality of process instance representations, wherein each element of the microservices network corresponds to an interface between a pair of microservices. Additionally, the operations include determining based on the microservices network representation a relative frequency for each of the plurality of microservices, each relative frequency corresponding to a likelihood that a change in a microservice will affect the functioning of at least one process using at least one of the plurality of microservices.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 2A-2E depict an example set of procedures performed by a system for managing microservice changes and providing associated analytics according to an embodiment.

DETAILED DESCRIPTION

Figure 1:
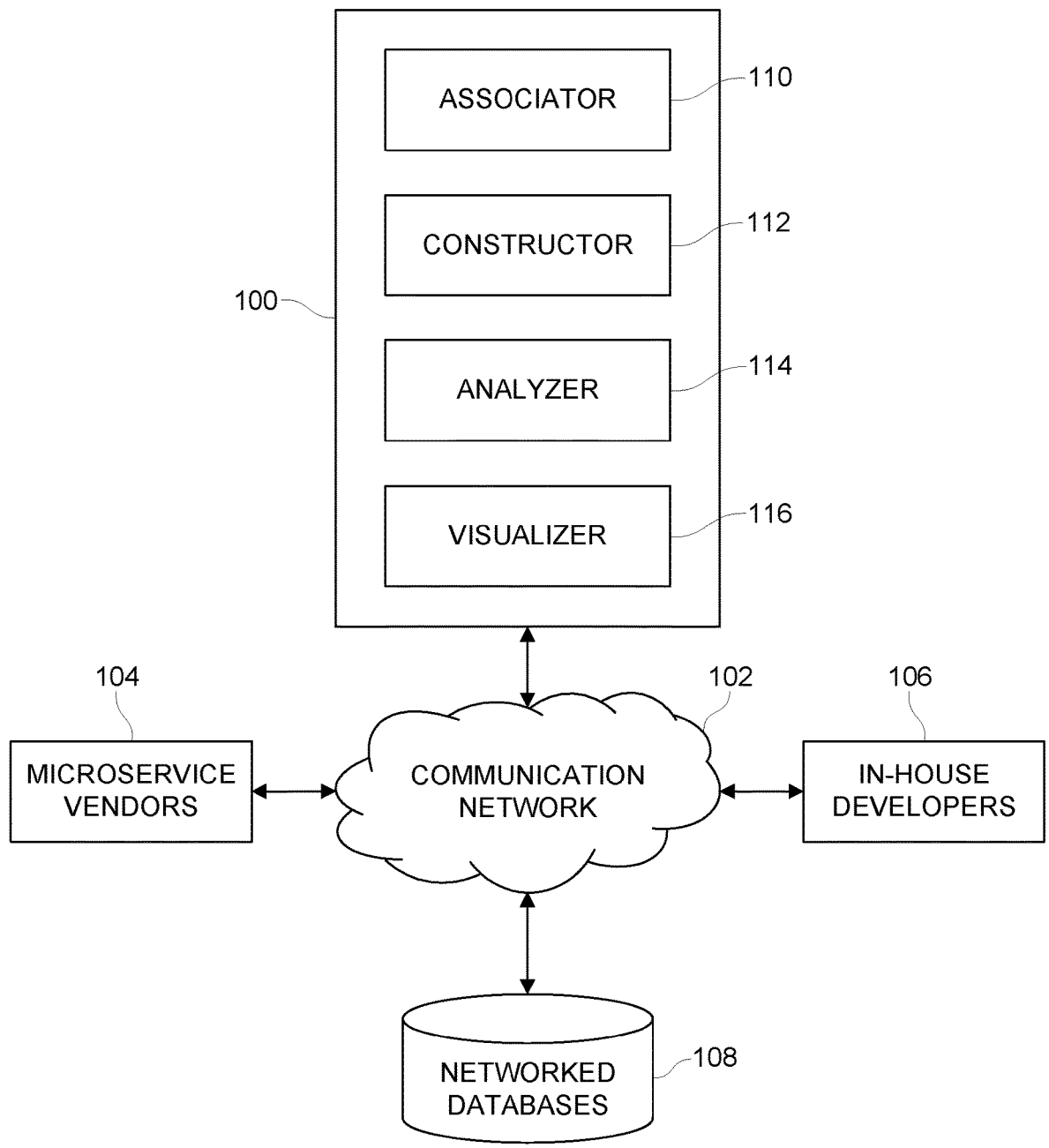
FIG. 1 depicts a system for managing microservice changes and providing associated analytics according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to software development and operations (DevOps), and more particularly, to monitoring and maintaining resiliency of microservices, as well as other networked elements, systems, and functions that participate in process instance representations. Thus, will the inventive aspects disclosed herein are described largely in the context of microservices, it is to be understood that the same aspects apply as described with respect to networked elements, systems, and functions that operate in process instance representations.

As defined herein, a "microservice" is any software construct that (i) is completely embodied in the instructions comprising a software program (as distinct from instructions called by the software program from instructions (code) not included in the software program itself) and (ii) is architecturally similar in structure and context to a traditional, so-called "microservice" typically used by a service oriented architecture. Although typically smaller than traditional services of software programs (e.g., software programs based on a service-oriented architecture), microservices are not characterized solely by size, nor is there is a determinative size demarcation between microservices and other services.

Microservices emerged in large part from a common set of DevOps principles developed through the morphing of monolithic applications into decomposed services that communicate via RESTful application programming interfaces (APIs) and other network-based messaging protocols. DevOps is an approach to the planning and coordination of complex interdependent processes associated with software development and information technology (IT) operations that are intended to speed up the production and deployment of software products and services. Modifications of monolithic programs are typically few and far between, often necessitating that operational dependencies and risks be determined in advance of any modification. By contrast, the goal of DevOps is optimization of small and frequent changes brought about by breaking large modifications down into small incremental steps. In the specific context of DevOps, microservices can provide significant benefits, including availability, modifiability, and scalability.

With microservices, software applications comprise multiple, smaller-sized runtime services. Thus, rather than building, integrating, and testing an entire application as a monolith in which even small changes require a full test cycle of the entire application, microservices can be delivered as independent runtime services with a well-defined application programming interface (API). Thus, the microservices approach allows fast delivery of smaller, more frequently implemented incremental changes to a program or an application.

Rapid deployment of new microservices and updated versions of existing microservices can pose challenges to maintaining the operability of software applications built on multiple microservices. The challenges can be considerable if various vendors or in-house developers push changes directly to production. It is not unheard of for a vendor to push out 10 or even 50 microservice changes in a single day. Moreover, when vendors or in-house developers push changes directly to production, the containerization services containing the previous software instructions are often destroyed. Thus, a history of changes regarding the microservices of an application may be lacking. The ability to roll back any changes is accordingly constrained, as is the ability to provide various analytics related to the microservices.

The methods, systems, and computer program products disclosed herein can generate data structures and representations to efficiently track changes to microservices. In some embodiments, various representations are constructed using vectors, matrices, and multi-dimensional tensors to compactly represent processes built by combining multiple microservices. In accordance with the inventive arrangements disclosed herein, a representation of a network of microservices can be constructed, the network comprising microservices that are used by multiple processes.

An aspect of constructing a network of microservices is the ability to assess the effect that a microservice change has not only with respect to the process for which the change was made, but also with respect to each other process that forms part of the network. In cases in which the same microservice is used by different processes—ranging from sophisticated banking applications to single devices that are part of the Internet of Things—the impact of a change in the microservice can affect each of the other processes that also use the microservice. Viewing microservices as a portfolio of services rather than limiting the view to a single process allows for an assessment of the effect of a microservice change on the portfolio of processes and not merely the effect on a process in isolation.

Another aspect of the inventive arrangements disclosed herein is the combination and compact representation of various classes of data for monitoring microservice changes. The combination and compact representation of data enables a computer system to more efficiently monitor the changes, thus improving the performance efficiency of microservices monitoring systems.

Another aspect of the inventive arrangements disclosed herein is the generation of various analytics for assessing changes in the dynamic behavior of a network of microservices. The analytics can assess the likely impact of microservice modifications and changes to one or more microservices. The analytics can assess the likely source of system errors and subpar performance of processes owing to recent changes in or modifications to one or more microservices. The analytics can enable a DevOps team to identify a microservice that should be rolled back (to a prior version after a new version is introduced) in order to bring a network of microservices back to a "normal" or "well-functioning" state.

Still another aspect is the visual presentment of microservice changes and related analytics in a manner that enables a user to more easily and more rapidly determine the nature and likely impact of the changes to one or more microservices that are part of a network of microservices.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Referring initially to FIG. 1, system 100 illustrates an embodiment of a system for managing and for assessing the likely effects of changes and modifications to microservices used to build computer software processes. System 100, the components of which are described in detail below, can be implemented in computer instructions (e.g., one or more program modules) executable on one or more processors such as processor 816 of a computer system such as computer system 812, both described with reference to FIG. 8. The computer system can be an element of a computing node such as computing node 800 also described with reference to FIG. 8. In other embodiments, system 100 can be implemented in hardwired circuitry or in a combination of hardwired circuitry and computer system-executable instructions.

Operatively, system 100 generates process instance representations that each represent the invocation of multiple microservices that are invoked by execution of different processes by one or more computer systems. A process instance representation corresponds to a process path, which is the ordered sequence in which microservices are invoked by a specific process. System 100 constructs a microservices network representation based on the multiple process instance representations, wherein each element of the microservices network corresponds to an interface between a pair of microservices. As defined herein, "interface" denotes a point within a process path at which one execution of one microservice concludes and another microservice is invoked.

System 100, based on the microservices network representation, determines a relative frequency indicating a likelihood that a change in a microservice will affect the functioning of at least one process using at least one of the microservices. A change in a microservice can include adding or dropping an interface to or from the microservice, replacing a current version of the microservice with a new version, and the like. System 100 can render the process paths, invocation representations, and network representations, as well as the relative frequencies, visually to a user using a display such as display 824 shown in FIG. 8.

System 100 can be implemented by an enterprise (or other user) that runs one or more processes that execute, or "run," on one or more computer systems. At least some of the processes can be configured according to a microservice architecture. Processes so configured can comprise a suite of independently deployable, typically small, modular services (microservices) that, in combination, provide computer-system executable instructions to carry out a particular process. The microservices can be produced based on DevOps principles and be provided to the enterprise by one or more microservice vendors and/or the enterprise's own in-house developers.

Illustratively, system 100 communicatively couples via communications network 102 with one or more microservice vendor network sites 104. Additionally, or alternatively, system 100 can communicatively couple to enterprise-wide, in-house developer network site 106 via communications network 102. System 100, as also shown, communicatively couples to one or more databases 108 via communications network 102. One or more databases 108, as described below, can include a microservices repository, as well as other databases accessible via communications network 102.

Communications network 102 can provide communication links between various data processing systems, including system 100, as well as individual devices and databases. The communication links can include connections, such as wired communication links, wireless communication links, or fiber optic cables, and can be implemented as, or include, one or more (or any combination of) different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, a Public Switched Telephone Network (PSTN), and so forth. Devices capable of coupling to communications network 102 via wired and/or wireless communication links can include mainframe computers, workstations, personal computers, portable computing or communication devices, tablet computers, mobile phones, or the like.

Different microservices and/or different versions of the same microservice can be delivered by a microservice vendor or vendors from one or more microservice vendor network sites 104 via communications network 102. For example, a vendor can deploy cloud-native microservices using lightweight containers, which enable the transfer of software between different operating environments and can be delivered from a centrally hosted cloud-based server. Similarly, different microservices and/or different versions of the same microservice can be deployed over communications network 102 from an enterprise-wide, in-house developer network site 106. The rapid development and deployment of microservices based on DevOps practices and continuous decentralized delivery can create definite advantages but requires close and effective monitoring, which can be provided by system 100.

System 100 illustratively includes associator 110, constructor 112, analyzer 114, and visualizer 116. Associator 110 retrieves data (e.g., metadata) from one or more databases 108 (e.g., microservice vendor data base), the data uniquely associated with individual microservices. The data retrieved by associator 110 can be descriptive metadata, structural metadata, administrative metadata, statistical metadata, and/or any other data corresponding to the microservices. For example, the data corresponding to a specific microservice can include a vendor ID, an indication of the version of the microservice, the version date, the number of interfaces of the microservice with one or more other microservices, as well as other microservice information. The data (e.g., metadata) retrieved by associator 110, in certain embodiments, can be represented vectorially. For example, the four-element vector, or 4-tuple, $(x_1, x_2, x_3, x_4)$=(microservice ID, microservice vendor, microservice version number, number of interfaces) corresponding to a microservice indicates an ID assigned to the microservice, the vendor providing the microservice, $x_2$, the version of the microservice, $x_3$, and the interface of the microservice (e.g., other microservices that call and/or are called by the microservice), $x_4$.

Constructor 112 constructs different representations of different classes of data corresponding to individual processes and the constituent microservices from which the processes are built. In certain embodiments described in greater detail below, constructor 112, using interface data retrieved by associator 110, generates an n-element vector, or n-tuple, that represents a process as a process path. A process path, as constructed by constructor 112, is an ordered sequence of the microservices, the ordered sequence specifying the order in which each microservice is invoked in performing the operations carried out by executing the process on a computer system. Accordingly, in a vector representation, each element of the vector can correspond to a microservice ID, and the element's position within the vector can indicate the order in which the microservice is invoked during execution of the process.

For example, the vector $(x_1, x_2, \ldots, x_8)$=(start, 1, 3, 1, 2, 5, 6, end) illustrates the representation of an asynchronous function (e.g., message) built from six microservices, numbered 1 through 6, that operate in the indicated sequence—specifically, execution of the process starts with the microservice whose ID is one. After microservice one executes, the microservice whose ID is invoked, after which microservice one again executes, followed by the microservice whose ID is two, and so on, until the microservice whose ID is six executes thereby ending execution of the process represented by process path vector (start, 1, 3, 1, 2, 5, 6, end).

An enterprise (or other user) may rely on multiple processes for carrying out various operations using one or more computer systems. Accordingly, in certain embodiments, constructor 112 can construct a representation of a network of microservices, the network comprising the microservices that are the modular components of each of the different processes used. In some embodiments, the representation constructed by constructor 112 is a matrix. A data structure corresponding to a process path can be represented by an n-by-n (n×n) matrix, wherein a one is added to each matrix cell in a row that corresponds to a microservice that invokes or calls a microservice and a column that corresponds to the microservice that is called or invoked. All elements of the matrix are initially zero.

In one embodiment, constructor 112 can construct an (M+P)×(M+P) matrix, where M represents the number of microservices in the network of microservices, and P represents the number of processes. (Note that not every process necessarily uses every microservice included in the network of microservices; a microservice is included in the network of microservices if the microservice is used invoked by at least one of the processes.) In various embodiments, constructor 112 can generate a similar matrix representation of containers that deliver microservices to data processing systems over a data communications network. In a matrix representation similar to that described above, each container-to-container invocation adds one to a matrix cell whose row corresponds to the invoking container and whose column corresponds to the container invoked. Each container, however, contains one or more microservices. Thus, each container in certain embodiments can be represented by vector whose elements correspond to microservices that are contained by the container.

System 100, in certain embodiments, creates a database that comprises a system-generated microservice attribute table based on data (e.g., metadata) associated with each microservice and retrieved by associator 110. The database can include a microservices network matrix corresponding to the microservices used by a plurality of processes, and the process paths corresponding to each process, as constructed by constructor 112. Vectors and matrices can be generalized to any number of dimensions using tensors. Thus, in certain embodiments, a two-dimensional microservice attribute table, a two-dimensional microservice network matrix, and a one-dimensional process path vectors can be combined into a five-dimensional tensor. (In the context of a tensor, each dimension is typically termed an axis and is a term used below.) Multi-dimensional tensors can be used by system 100 to combine various classes of system-generated data, as described in greater detail below with reference to FIG. 3.

Over the course of time processes are revised, often quite frequently, by introducing new versions of one or more of the microservices from which the processes are built. Similarly, new microservices can be added or current ones deleted from a process. System 100 can create a revised or updated network matrix for each new version of one or more of the microservices or revision of one or more processes, thereby generating a time series that can be used to compare the current versions of microservices with past versions and/or with planned future versions.

Based on the comparisons, analyzer 114 can generate analytics to assess the likely effects of changes in or modifications to a network of microservices and/or individual processes that use one or more of the microservices. For example, analyzer 114 can perform a matrix subtraction to subtract a proposed microservices network structure from a current version, which can identify for a DevOps team the specific microservices and/or interfaces between microservice pairs that are most likely to affect the network's or an individual process's performance or dynamic behavior. Analyzer 114 can use the same procedure if a process, newly updated by a change in or modification to one or more microservices, fails to perform properly. Analyzer 114 can identify for the DevOps team the microservice that most likely needs to be rolled back in order to bring the process back to a "normal" or "well-functioning" state. Algorithmic aspects of the procedures for assessing the effects of changes to microservices are described in the context of the following examples. Although described for ease of presentation and without loss of generality in the context of asynchronous process instances (e.g., messages), it is noted that the procedures are equally applicable with respect synchronous process instances (e.g., RESTful-APIs).

Figure 2A:
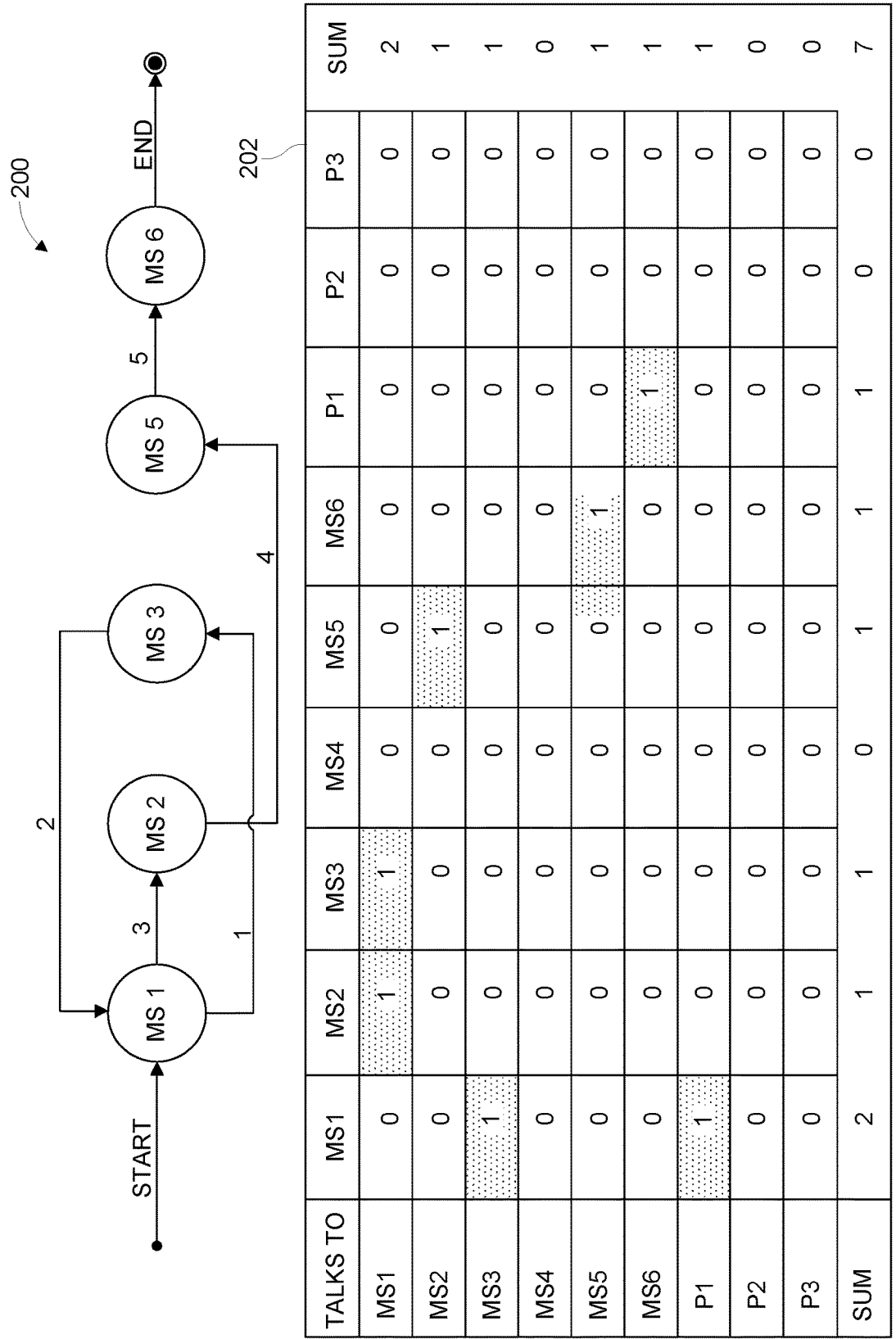

Referring additionally now to FIGS. 2A-2E, the construction by constructor 112 of invocation matrices for three illustrative process paths are described, as are the construction of a network matrix and corresponding relative frequency matrix. FIG. 2A depicts an invocation matrix corresponding to process 200, the above-described process whose process path can be represented vectorially as (start, 1, 3, 1, 2, 5, 6, end). Process 200 begins with invocation of microservice MS1, which invokes microservice MS3, which in turn invokes MS1. After MS1 again executes, the microservice invokes MS2, which executes and invokes microservice MS5. MS5 executes and then invokes microservice MS6, which upon completion ends process 200.

Invocation matrix 202 includes a row (row 7) labeled P1 corresponding to process 200. Invocation matrix 202 also includes rows (rows 8 and 9) for each of the other two illustrative processes yet to be described. (The reason for including rows for the other processes will become apparent as the procedure is described.) Row 7, column 1 of invocation matrix 202 has a value of one to denote the initial call to MS1. Row 1, column 2 and row 1, column 3 are both one, which denote, respectively, MS1's invocation of MS2 and MS1's invocation of MS3. Row 2, column 5 of invocation matrix 202 is one to denote MS2's invocation of MS5. Row 3, column 1 is one to denote MS3's invocation of to MS1. Row 5, column 6 is one to denote MS5's invocation of MS6. MS6 concludes execution of process 200, which is indicated by one at row 6, column 7 of invocation matrix 202. All other row-column elements of invocation matrix 202 are zero.

Note that row 4 and column 4 of invocation matrix 202 comprise all zeros, owing to the fact that process 200 does not use microservice MS4. MS4, however, is used in the other of the two processes and is thus part of invocation matrix 202. Note also that the summation of each row in the last column represents the number of innovations or "outgoing calls" that the microservice represented by the row makes to other microservices executed by process 200. The summation of each microservice column in the last row of invocation matrix 202 represents the number of "incoming calls" made to the microservice represented by the column. Although each cell of invocation matrix 202 illustratively includes only zeros and ones, it is pointed out that more generally a cell number corresponds to the number of invocations, or interfaces, between two microservices. Thus, more generally, if the i-th microservice invokes the j-th microservice n times during the execution of the process represented by the invocation matrix, then the i-th row, j-th column of the invocation matrix takes on the value n to reflect the number of corresponding invocations or interfaces.

Figure 2B:
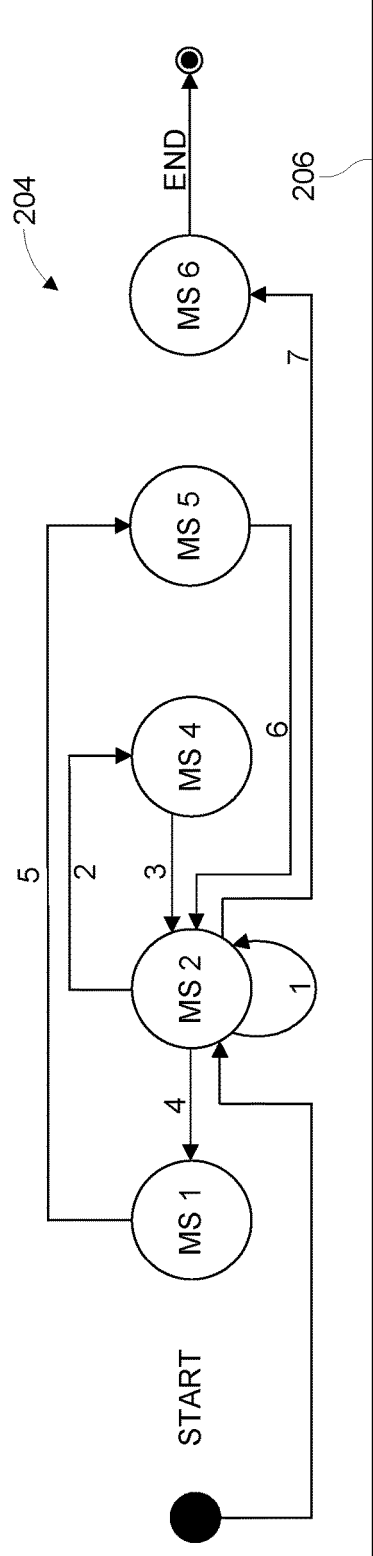

FIG. 2B depicts an invocation matrix representation of process 204, whose process path is represented vectorially as (start, 2, 2, 4, 2, 1, 5, 2, 6, end) corresponding to initial invocation of microservice MS2, which invokes itself and then invokes microservice MS4. Microservice MS4 executes and invokes MS2, which invokes microservice MS1. MS1 executes and invokes microservice MS5, which after executing, invokes microservice MS2. MS2 executes and invokes microservice MS6, whose execution ends the process. The execution-invocation sequence is represented by invocation matrix 206. One at row 8, column 2 indicates the initial invocation by process 204 of microservice MS2. MS2's call to itself is indicated by the one at row 2, column 2. One at row 2, column 4 indicates MS2's invocation of microservice MS4. One at row 4, column two indicates MS4's invocation of MS2, and one at row 2, column 1 indicates MS2's invocation of microservice MS1, and so on.

Figure 2C:
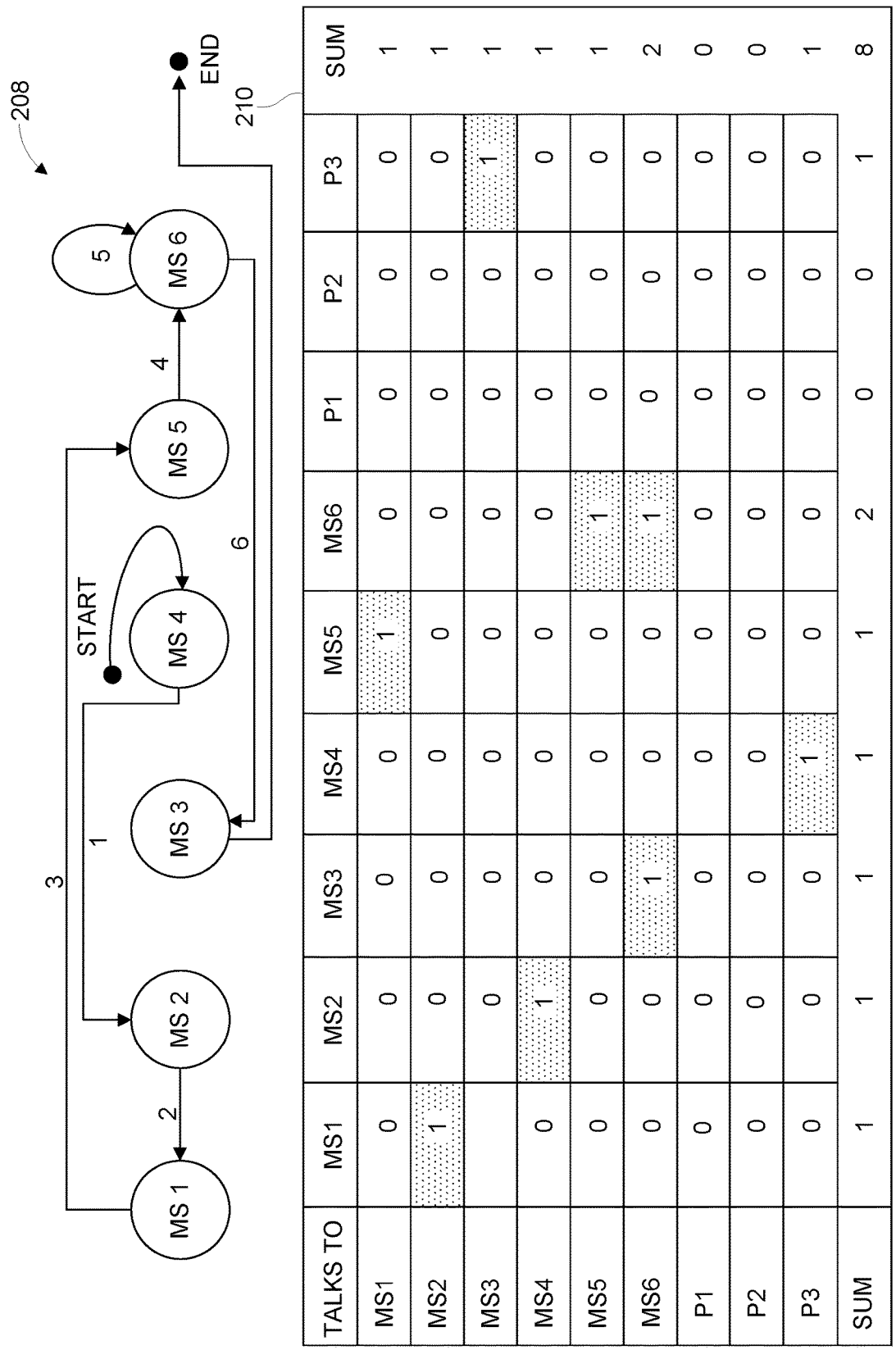

FIG. 2C depicts an invocation matrix representation for process 208, whose process path is represented vectorially as (start, 4, 2, 1, 5, 6, 6, 3, end). Invocation matrix 210 corresponding to process 208, accordingly, contains ones in each of the following cells as listed in the order that the microservices are invoked: row 9, column 4; row 4, column 2; row 2, column 1; row 1, column 5; row 5, column 6; row 6, column 6; row 6, column 3; and row 3, column 9, the last cell corresponding to the end of process 208 which occurs upon completion of microservice MS3's execution by process 208.

FIG. 2D depicts network matrix 212, which constructor 112 generates by performing matrix addition of the three respective 9×9 invocation matrices 202, 206, and 210. Matrix summation aggregates the interfaces (incoming and outgoing interface connections) between the microservices that form a network of microservices, various one of which are used in different combinations by processes 200, 204, and 208. A distribution, or relative frequency, matrix is generated by analyzer 114 from network matrix 212.

FIG. 2E depicts relative frequency matrix 214 as generated based on network matrix 212. Relative frequency matrix 214 is generated by analyzer 114 dividing each cell in each row of matrix 212 by the sum (if not zero) of the cells within that row. Thus, in row 1 of relative frequency matrix 214, 50 percent of microservice MS1's call are to microservice MS5, while only 25 percent are to microservice MS2 and 25 percent to microservice MS3, respectively. This implies that microservice MS5 is most likely affected by a change or modification to microservice MS1. Similarly, row 2 of relative frequency matrix 214 indicates that microservice MS2 is most likely affected by a change to microservice MS1 since 33 percent of MS2's calls are to MS1, while microservices MS4, MS5, and MS6, respectively, each account for only a 17 percent share of MS2's invocations (the percentages to do not sum to one because MS2 invokes itself in process 204). A similar analysis can be performed by analyzer 114 based on a relative frequency of incoming calls as well. Processes 200, 204, and 208, invocation matrices 202, 206, and 210, network matrix 212, and relative frequency matrix 214 can be visually presented, as shown, by visualizer 116.

Relative frequency matrix 214 provides another analytic. The higher the non-zero value within a cell of the matrix, the greater the relative importance of the microservice corresponding to that cell's row and the microservice corresponding to that cell's column. For example, the highest cell value of relative frequency matrix 214 is in row 4, column 2. The next highest value is in row 5, column 6. Accordingly, in the event of an error or failure of one or more of processes 200, 204, and 208, microservice MS4 and microservice MS2, as well as the interfaces between the microservices, should be considered first by a DevOps team. Microservices MS5 and MS6, and the microservices interface, should be considered next. The analytics provided by analyzer 114 can thus guide a DevOps team in seeking to determine whether, and if so, which changes or modifications to one or more microservices is the source of a process's failure or sub-par performance of the network of microservices.

Another analytic generated by analyzer 114 corresponds to seriatim changes made to a process or processes by introducing new microservice interfaces or dropping old ones. The changes are tracked by system 100 generating updated invocation matrices in response to the changes. Thus, a time series of m invocation matrices corresponding to a process can reflect m updates that occurred with one or more new interfaces between one or more pairs of microservices being introduced and/or one or more prior ones being deleted. Bearing in mind that, as described above, the i-th row, j-th column of an invocation matrix assumes a value, n, corresponding to the number of invocations or interfaces between a pair of microservices, matrix subtraction of the penultimate invocation matrix from the latest one identifies the specific changes that have occurred.

For example, if the number of interfaces between the i-th microservice and the j-th microservice are not changed between the immediate version of a process and the last version, then matrix subtraction yields zero at the i-th row, j-th column of the resulting matrix. If, however, the value at the i-th row, j-th column of the invocation matrix of the prior version of the process is k, but is l in the invocation matrix corresponding to the current version of the process, then the i-th row, j-th column of the resulting matrix after subtraction would be l-k. A difference greater than zero indicates an increase in the number of interfaces, while a difference less than zero indicates a decrease. As described below, the same procedures apply with respect to a network matrix, such as network matrix 212, for a network of microservices.

The updating provided by a newly constructed invocation matrix in response to the changes described can be used to update the network matrix constructed by matrix summation of multiple invocation matrices. The network matrix is revised by summing invocation matrices, one or more of which is newly revised in response to one or more changes in the interfaces between one or more pairs of microservices. Matrix subtraction of the prior network matrix from the revised network matrix can identify the effects of the changes on the network of microservices.

The results of matrix subtraction can identify for a DevOps team sources of changes in dynamic behavior of a process or network of microservices, enabling the DevOps team to identify a microservice that should be rolled back in order to bring the process or network of microservices back to a "normal" or "well-functioning state." In one embodiment, system 100 responds to a system error or subpar performance of one or more processes by determining a likely source of the problem. The likely source can be determined by constructor 112 generating a current matrix, either an invocation matrix corresponding to a specific process if the process is positively identified as experiencing the problem or, if the specific process is not identified, a network matrix. The prior version of the matrix can be subtracted from the newly generated current version of the matrix by analyzer 114. Matrix subtraction can be used for determining the likely source if the problem stems from a change related to the microservices. The matrix resulting from matrix subtraction will have zeros in any cells corresponding to microservices that have not been updated, not newly added, or for which interfaces have not been added or dropped. A cell or cells having a non-zero value, however, indicates such a change (or changes) having been made between generation of the current matrix and the prior matrix. A non-zero value in one or more columns corresponds to a microservice that is called by one or more other microservices, each calling microservice indicated by the row of a non-zero cell. System 100 can perform a roll back to the prior version of the called microservice in order to restore affected processes to the well-functioning state that obtained prior to the change.

If the matrix subtraction reveals multiple microservice changes, system 100 can reference the analytics provided by the relative frequency matrix to determine the most likely source of the problem as being the changed microservice that is most frequently called, as described above. If the problem is not resolved by roll back of that microservice, system 100 can roll back the microservice next most likely to be the source of the problem (the microservice corresponding to the next highest relative frequency). System 100 can continue to roll back microservices iteratively beginning with the microservice having the highest relative frequency until the problem is resolved.

Matrix subtraction of one matrix from another requires that both matrices have identical dimensions. Thus, in the event that two matrices are not of the same dimension due to the introduction of one or more new processes or microservices (the dimensions of the updated matrix increases with each newly introduced process or microserve), the identification of a faulty/erroneous element can be determined differently. Specifically, the identification of a faulty/erroneous element can be traced back to the new process or microservice (newly introduced into an updated matrix) by determining post-updated row and column counts of each microservice and comparing these to the counts before the introduction of the new process or microservice. The procedure will provide an indicative analysis of how the dynamic behavior of the prior network changed with introduction of the new process or microservice.

Upon identifying a microservice as a likely source of a process error, system 100 can mark the microservice as faulty. System 100 can select a different version of the microservice (e.g., a prior version that executed by one or more processes without error) and retrieve the different version of the microservice from a networked microservice repository via communications network 102. If the system determines that in fact the microservice is the source of the process error, then the process invokes the substitute version of the microservice when the process executes on a computer system.

One or more databases 108 can include a database, or several databases, that electronically store the software instructions (code) corresponding to various versions of the microservices. System 100 can utilize data (e.g., metadata) retrieved by associator 110 to identify a source of the prior version of a microservice and retrieve the prior version from the source to facilitate the roll back. The data, for example, can provide a microservice ID, version number, date the microservice was deployed, microservice vendor, and the like. System 100 can use the data to identify a database from among the one or more databases 108 from which the software instructions comprising the microservice can be retrieved. The software instructions can be retrieved from the database by system 100 via communications network 102. Alternatively, or additionally, system 100 can itself store prior versions of a microservice. For example, system 100 can store the prior versions as a clear-text matrix.

Still another analytic generated by analyzer 114 anticipates affects related to proposed microservice changes. The analytic is derived from constructor 112 constructing one or more new or revised invocation matrices based on proposed newly added or dropped interfaces between one or more microservices. The newly constructed or revised invocation matrices can be used to generate a corresponding new or revised network matrix. Analyzer 114 can perform matrix subtraction by subtracting the network matrix corresponding to a current version of the network from a network matrix corresponding to the proposed version. The resulting matrix indicates the specific interfaces and corresponding microservices most likely to be affected by the proposed changes.

Figure 3:
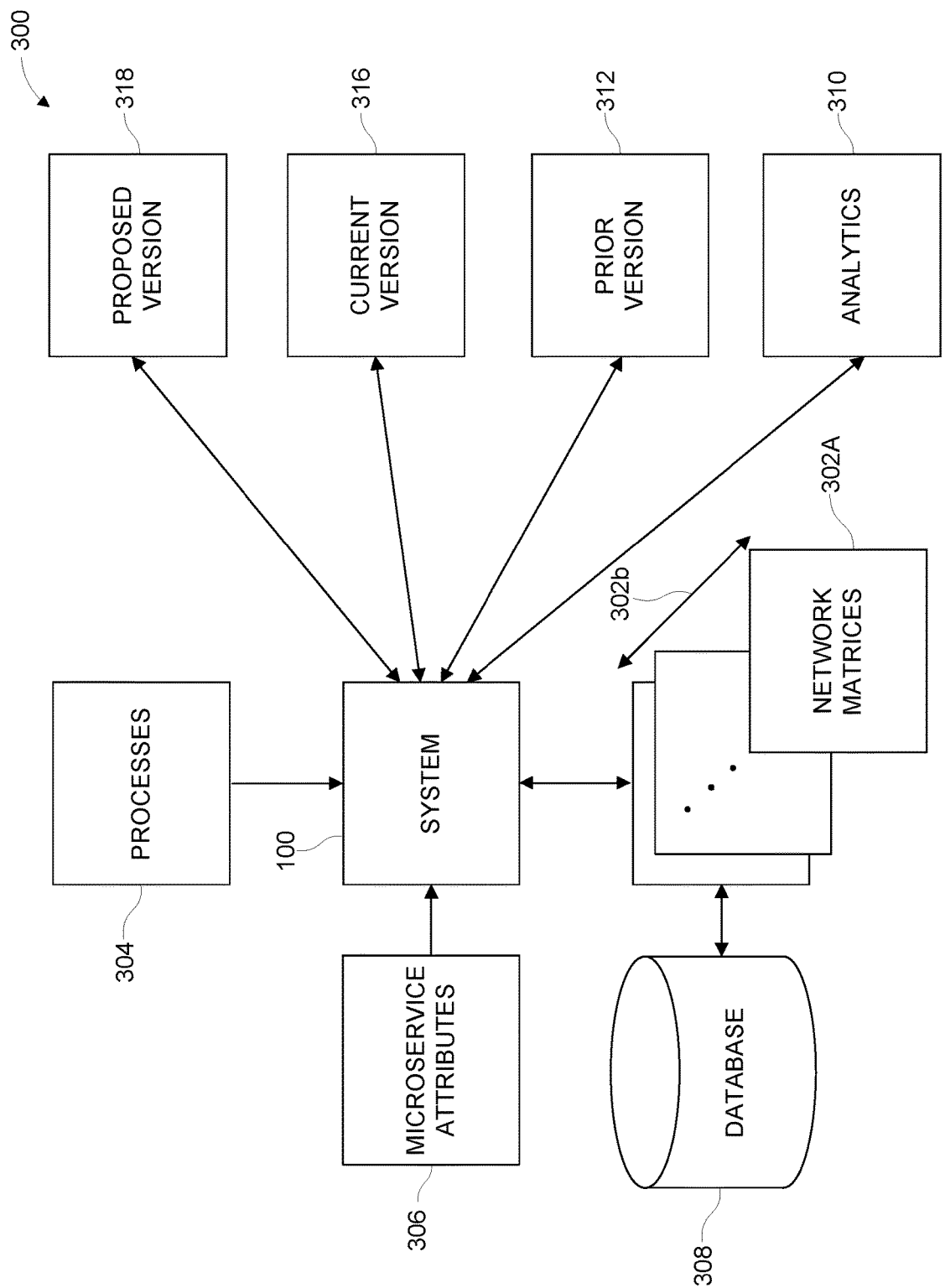
FIG. 3 depicts certain operative features performed by a system for managing microservice changes and providing associated analytics according to an embodiment.

Referring additionally now to FIG. 3, operative features 300 of system 100 according to one embodiment are depicted schematically. Constructor 112 illustratively generates network matrices 302a arrayed along time axis 302b to form a tensor. Network matrices 302a can be constructed by constructor 112 summing individual invocation matrices corresponding to processes 304 and data 306, which is associated with each of the processes by associator 110. Data 306 and the tensor comprising network matrices 302a arrayed as time series along time axis 302b can be stored in database 308. In certain embodiments, network matrices 302a and time axis 302b are part of a multi-dimensional tensor (additional axes not explicitly shown) that also include, for example, arrays indicating the vendor and/or version of each microservice. The multi-dimensional tensor stored in database 308 thus can indicate, at each point in time, the then-current vendor and/or version of each microservice that is part of the network of microservices.

A new network matrix is generated by constructor 112 and added to network matrices 302a arrayed as a time series along time axis 302b in response to each change made to one or more processes (including in response to a newly introduced process or dropping of an old process). The changes, as described above, include changes to interfaces between any pair of microservices in the network of microservices. The changes can also include introducing a new version of one or more microservices and/or substituting one vendor's version of a microservice for that of another vendor. In response to an error or failure involving at least one process following such a change, analyzer 114 generates analytics 310. If a roll back of the current version of one or more processes is necessary, system 100 can obtain the appropriate software from database 308 or from a networked microservices repository via communications network 102. Analytics 310 can be generated by a matrix subtraction of network matrix (prior version) 312 from network matrix 314 (current version). With respect to a proposed change (e.g., interface change, change in version, change in vendor) to one or more microservices, constructor 112 can generate network matrix 318 (proposed version). Performing matrix subtraction, subtracting network matrix 314 (current version) from network matrix 318 (proposed version), analyzer 114 can identify potential sources of problems posed by the proposed changes to one or more interface connections between any pair of microservices in the network.

Figure 4:
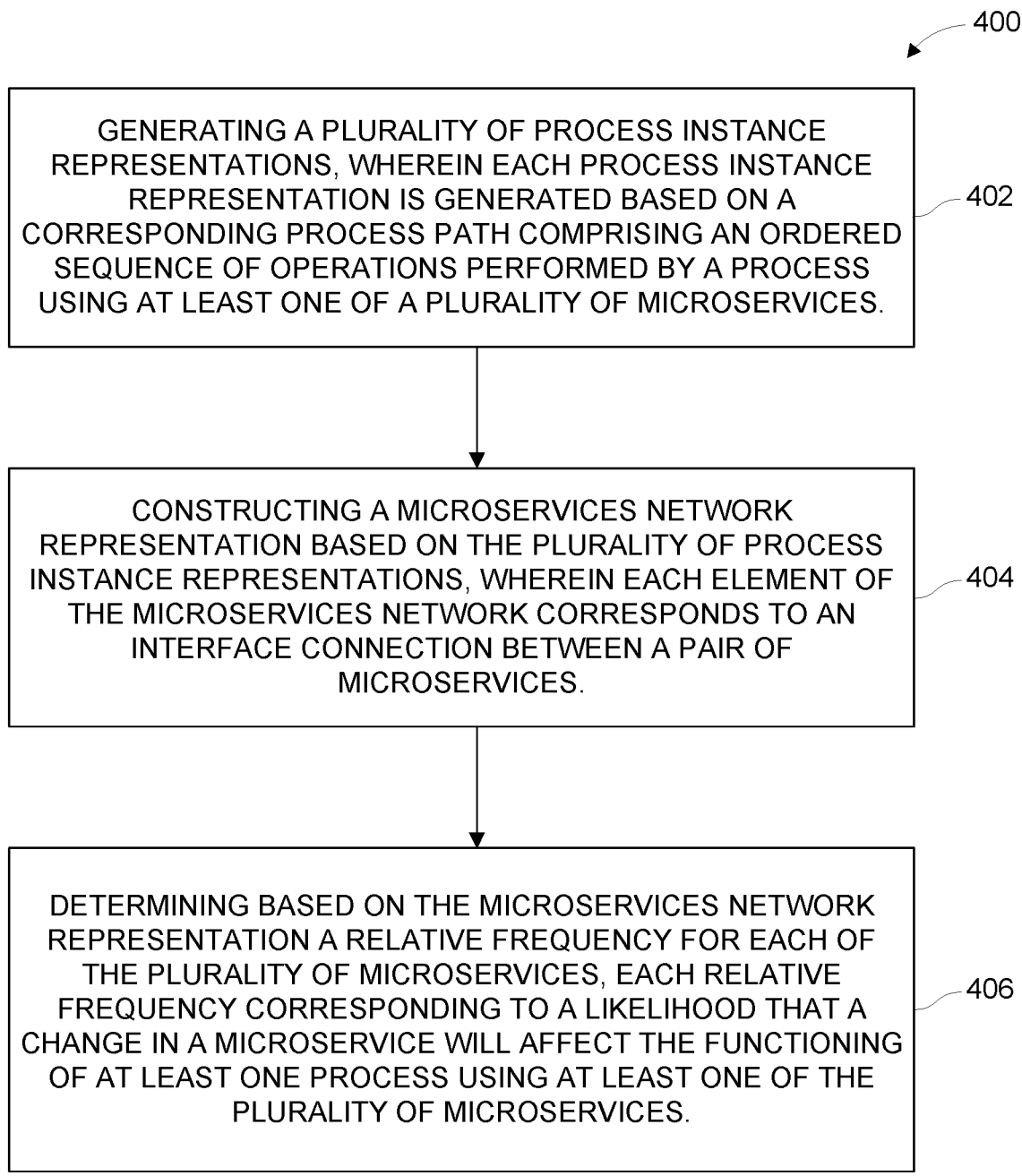
FIG. 4 depicts a method for managing microservice changes and providing associated analytics according to an embodiment.

FIG. 4 is a flowchart of method 400 for managing microservice changes and performing related analytics according to one embodiment. Method 400 can be performed by a system the same or similar to the systems described with reference to FIGS. 1-3. The system at block 402 generates multiple process instance representations. Each process instance representation is generated based on a corresponding process path comprising an ordered sequence of operations performed by a process using at least one of the microservices.

The system at block 404 constructs a microservices network representation based on the process instance representations. Each element of the microservices network corresponds to an interface between a pair of the microservices. At block 406, the system determines a relative frequency for each of the microservices based on the microservices network representation. Each relative frequency corresponds to a likelihood that a change in a microservice will affect a performance or the functioning of at least one process using at least one of the microservices.

The process instance representations, in certain embodiments, comprise invocation matrices. In certain embodiments, the microservices network representation comprises a network matrix constructed by performing a matrix addition that sums multiple invocation matrices. The system in certain embodiments determines the relative frequencies of each of the microservices by generating a relative frequency matrix based on the network matrix.

A change in a microservice can be a change in an interface between the microservice and another process using at least one of the microservices. The change can be a substitution of one version of the microservice for another version of the microservice.

Figure 5:
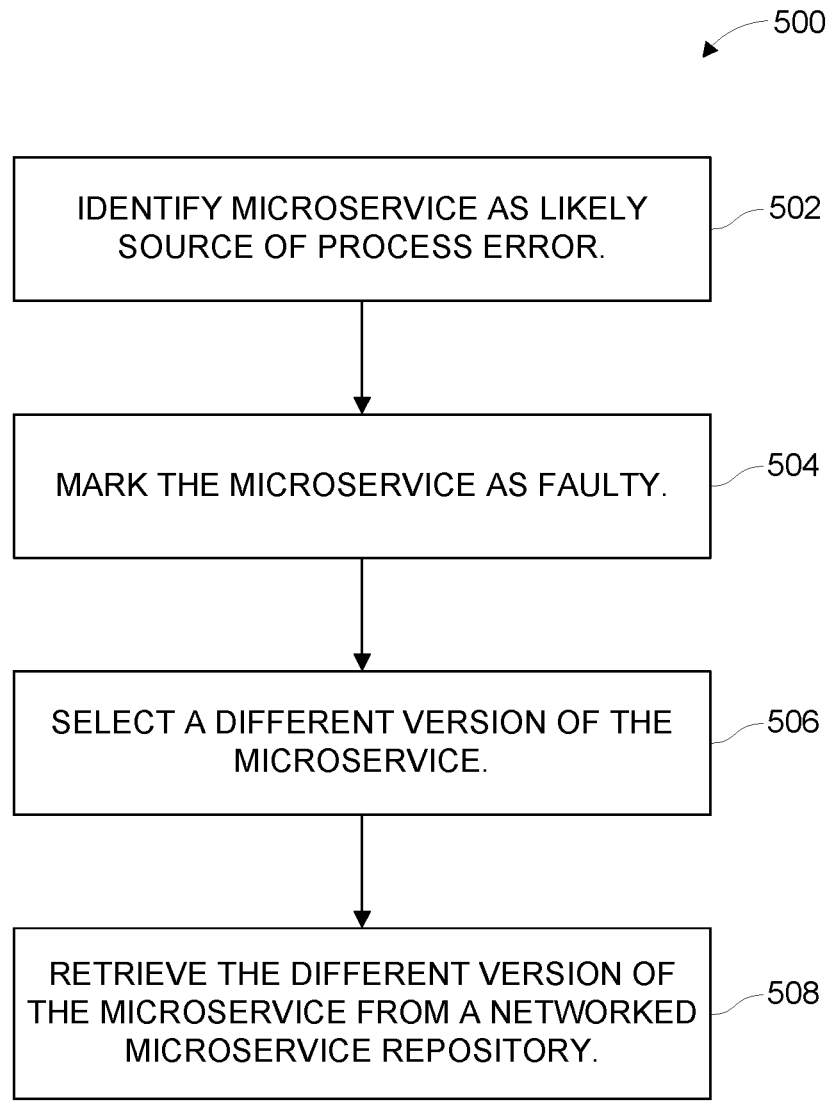
FIG. 5 depicts a method of rolling back a microservice indicated as a possible problem source by a system for managing microservice changes and providing associated analytics according to an embodiment.

In one or more embodiments, method 400 further comprises the system responding to a process error by identifying a microservice as a likely source of the process error. Referring additionally to FIG. 5, a flowchart of method 500 responding to a process error according to an embodiment is depicted. Method 500 also can be performed by a system the same or similar to the systems described in reference to FIGS. 1-3. The system at block 502 identifies the microservice that is the likely source of a process error. At block 504, the system marks the microservice identified as the likely source of the process error as faulty. At block 506, the system selects a different version of the microservice and, at block 508, retrieves the different version of the microservice from a networked microservice repository. If the system determines that in fact the microservice is the source of the process error, then the process invokes the substitute version of the microservice when the process executes on a computer system. In the event that more than one microservice is determined to be possibly faulty, the system can apply the procedure iteratively beginning with the microservice having the highest relative frequency of invocation and continue until the microservice or microservices that are in fact faulty are discovered and rolled back.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
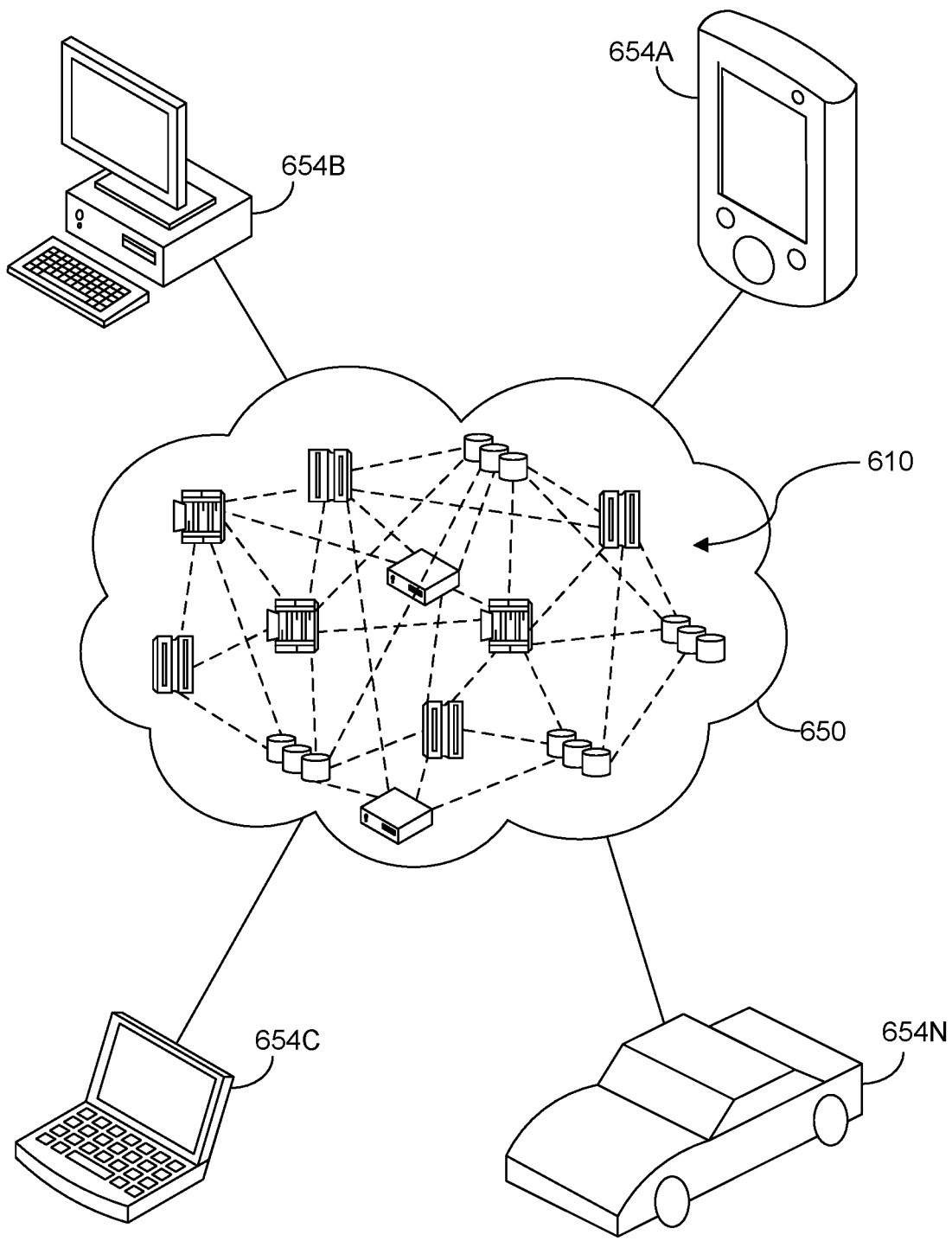
FIG. 6 depicts a cloud computing environment according to an embodiment.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Cloud computing nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that cloud computing nodes 610 and cloud computing environment 650 can communicate with any type of computerized device over any type of network and/or network addressable connection (e.g., using a web browser).

Figure 7:
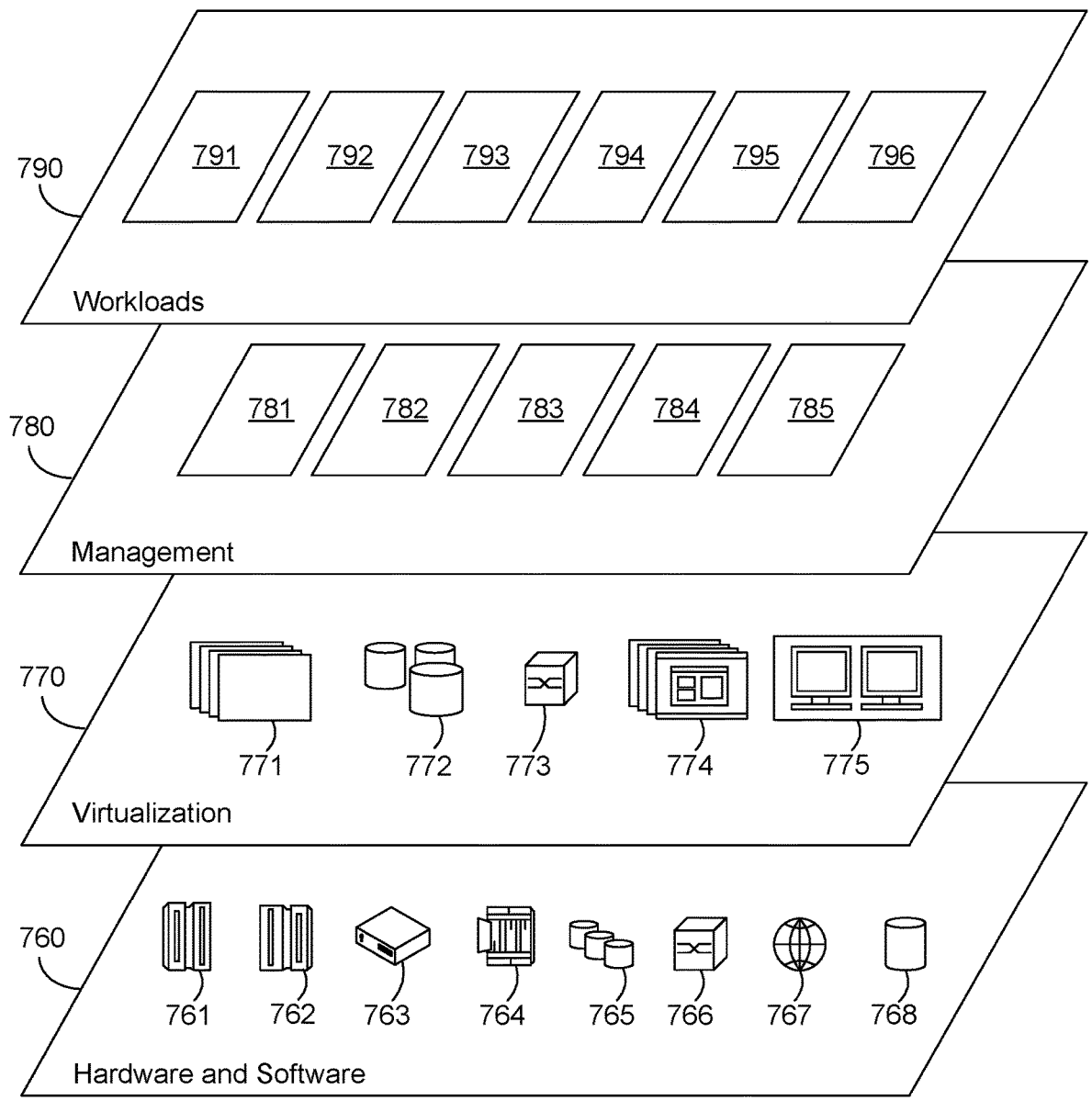
FIG. 7 depicts abstraction model layers according to an embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and managing microservices change and performing related analytics 796.

Figure 8:
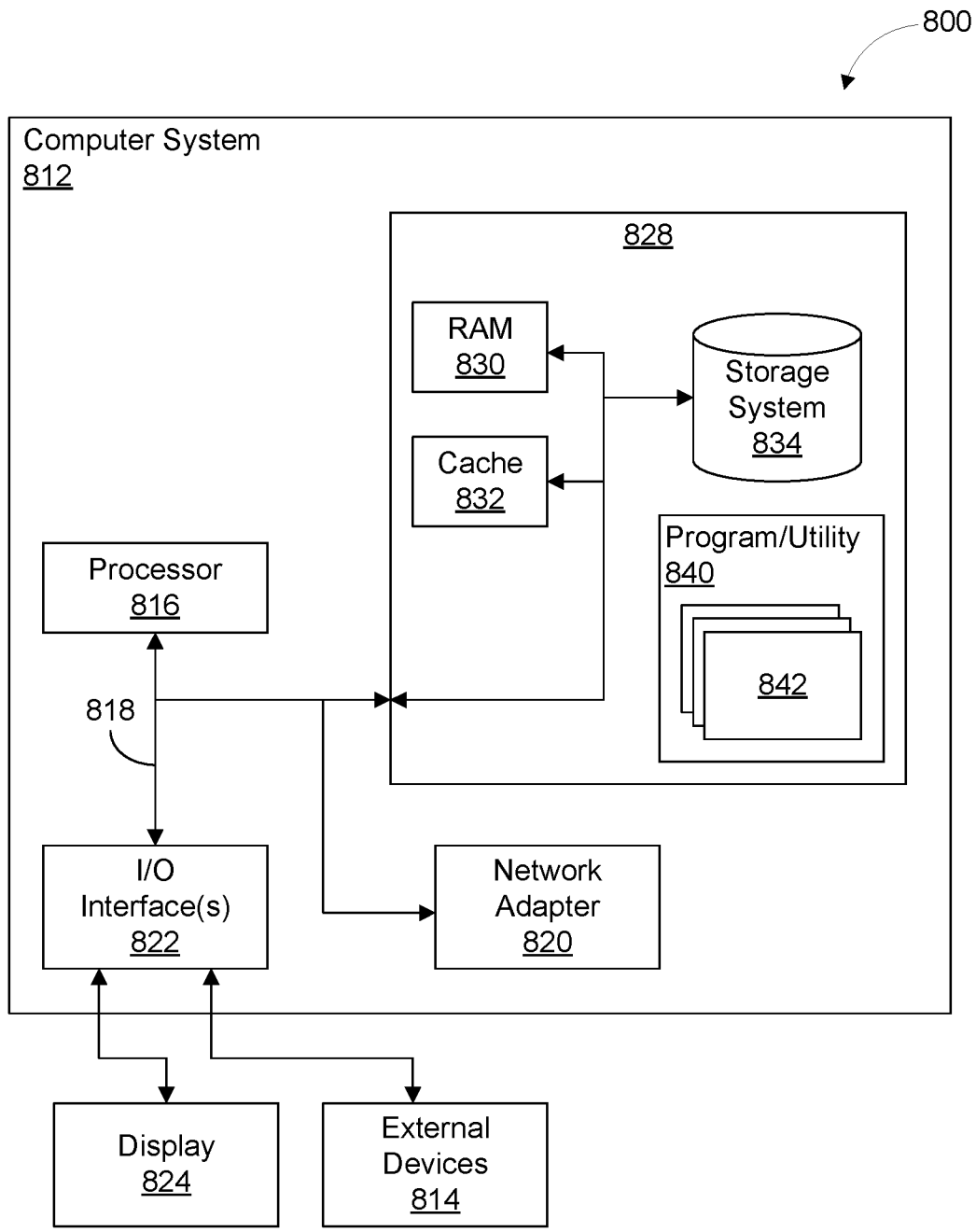
FIG. 8 depicts a cloud computing node according to an embodiment.

FIG. 8 illustrates a schematic of an example of a computing node 800 in which a system such as system 100 for managing microservices and performing related analytics can be implemented. In one or more embodiments, computing node 800 is an example of a suitable cloud computing node. Computing node 800 is not intended to suggest any limitation as to the scope of use or functionality of embodiments of the invention described herein. Computing node 800 is capable of performing any of the functionality described within this disclosure.

Computing node 800 includes a computer system 812, which is operational with numerous other general-purpose or special-purpose computing system environments or configurations. Examples of well-known computing systems, environments, and/or configurations that may be suitable for use with computer system 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 812 may be described in the general context of computer system-executable instructions, such as program modules, being executed by a computer system. Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 812 is shown in the form of a general-purpose computing device. The components of computer system 812 may include, but are not limited to, one or more processors 816, a memory 828, and a bus 818 that couples various system components including memory 828 to processor 816. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Computer system 812 typically includes a variety of computer system-readable media. Such media may be any available media that is accessible by computer system 812, and may include both volatile and non-volatile media, removable and non-removable media.

Memory 828 may include computer system readable media in the form of volatile memory, such as random-access memory (RAM) 830 and/or cache memory 832. Computer system 812 may further include other removable/non-removable, volatile/non-volatile computer system storage media. By way of example, storage system 834 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. For example, one or more of the program modules may workloads and functions 796, or portions thereof, for managing microservice changes and performing related analytics.

Program/utility 840 is executable by processor 816. Program/utility 840 and any data items used, generated, and/or operated upon by computer system 812 are functional data structures that impart functionality when employed by computer system 812. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Bus 818 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via input/output (I/O) interfaces 822. Still, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components could be used in conjunction with computer system 812. Examples, include, but are not limited to: microcode, device drivers, redundant processing units, external disk drive arrays, RAID systems, tape drives, and data archival storage systems, etc.

Computing node 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 800 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Computing node 800 can be a cloud computing node, for example, in which computer system 812 is implemented. Computer system 812 also illustrates a computer system used in a non-cloud computing implementation to perform the various operations described herein. In this regard, the example embodiments described herein are not intended to be limited to a cloud computing environment or any other computing environment. More generally, computing node 800 is illustrative of various types of data processing systems. As defined herein, "data processing system" means one or more hardware systems configured to process data, each hardware system including at least one processor programmed to initiate operations and memory.

The terminology used herein is for the purpose of describing particular embodiments only and is not intended to be limiting. Notwithstanding, several definitions that apply throughout this document now will be presented.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" is a human being. Relatedly, "enterprise" refers a collection of users who, for one or more related purposes, use one or more computer systems.

The terms first, second, etc. may be used herein to describe various elements. These elements should not be limited by these terms, as these terms are only used to distinguish one element from another unless stated otherwise or the context clearly indicates otherwise.

As described above, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    generating, with computer hardware, a plurality of process instance representations, wherein each process instance representation is generated based on a corresponding process path comprising an ordered sequence of operations performed by a process using at least one of a plurality of microservices;
    constructing a microservices network representation based on the plurality of process instance representations, wherein each element of the microservices network corresponds to an interface between a pair of microservices; and
    determining based on the microservices network representation a relative frequency for each of the plurality of microservices, each relative frequency corresponding to a likelihood that a change in a microservice will affect performance of at least one process using at least one of the plurality of microservices.

2. The method of claim 1, wherein the process instance representations comprise invocation matrices and the microservices network representation comprises a network matrix constructed by performing a matrix addition for summing the invocation matrices.

3. The method of claim 2, wherein the determining comprises generating a relative frequency matrix based on the network matrix.

4. The method of claim 1, wherein the change in the microservice comprises a change in an interface between the microservice and another process using at least one of the plurality of microservices.

5. The method of claim 1, wherein the change in the microservice comprises substituting one version of the microservice for another version of the microservice.

6. The method of claim 1, further comprising responding to a process error by identifying a microservice as a likely source of the process error.

7. The method of claim 6, further comprising rolling back a current version of the microservice identified as the likely source by
    marking the microservice as faulty;
    selecting a different version of the microservice; and
    retrieving the different version of the microservice from a networked microservice repository.

8. A system, comprising:
    a processor configured to initiate operations including:
        generating a plurality of process instance representations, wherein each process instance representation is generated based on a corresponding process path comprising an ordered sequence of operations performed by a process using at least one of a plurality of microservices;
        constructing a microservices network representation based on the plurality of process instance representations, wherein each element of the microservices network corresponds to an interface between a pair of microservices; and
        determining based on the microservices network representation a relative frequency for each of the plurality of microservices, each relative frequency corresponding to a likelihood that a change in a microservice will affect performance of at least one process using at least one of the plurality of microservices.

9. The system of claim 8, wherein the process instance representations comprise invocation matrices and the microservices network representation comprises a network matrix constructed by performing a matrix addition for summing the invocation matrices.

10. The system of claim 9, wherein the determining comprises generating a relative frequency matrix based on the network matrix.

11. The system of claim 8, wherein the change in the microservice comprises a change in an interface between the microservice and another process using at least one of the plurality of microservices.

12. The system of claim 8, wherein the change in the microservice comprises substituting one version of the microservice for another version of the microservice.

13. The system of claim 8, wherein the processor is configured to initiate operations further comprising:
    responding to a process error by identifying a microservice as a likely source of the process error; and
    rolling back a current version of the microservice identified as the likely source by marking the microservice as faulty, selecting a different version of the microservice, and retrieving the different version of the microservice from a networked microservice repository.

14. A computer program product, the computer program product comprising:
one or more computer-readable storage media and program instructions collectively stored on the one or more computer-readable storage media, the program instructions executable by a processor to cause the processor to initiate operations including:
generating, with computer hardware, a plurality of process instance representations, wherein each process instance representation is generated based on a corresponding process path comprising an ordered sequence of operations performed by a process using at least one of a plurality of microservices;
constructing a microservices network representation based on the plurality of process instance representations, wherein each element of the microservices network corresponds to an interface between a pair of microservices; and
determining based on the microservices network representation a relative frequency for each of the plurality of microservices, each relative frequency corresponding to a likelihood that a change in a microservice will affect performance of at least one process using at least one of the plurality of microservices.

15. The computer program product of claim 14, wherein the process instance representations comprise invocation matrices and the microservices network representation comprises a network matrix constructed by performing a matrix addition for summing the invocation matrices.

16. The computer program product of claim 15, wherein the determining comprises generating a relative frequency matrix based on the network matrix.

17. The computer program product of claim 14, wherein the change in the microservice comprises a change in an interface between the microservice and another process using at least one of the plurality of microservices.

18. The computer program product of claim 14, wherein the change in the microservice comprises substituting one version of the microservice for another version of the microservice.

19. The computer program product of claim 14, further comprising responding to a process error by identifying a microservice as a likely source of the process error.

20. The computer program product of claim 19, further comprising rolling back a current version of the microservice identified as the likely source by
marking the microservice as faulty;
selecting a different version of the microservice; and
retrieving the different version of the microservice from a networked microservice repository.

* * * * *